Patented Nov. 18, 1941

2,262,754

UNITED STATES PATENT OFFICE 2,262,754

ANTISPASMODIC AGENTS

Robert R. Burtner, Niles Center, Ill., assignor to G. D. Searle & Co., Chicago, Ill., a corporation of Illinois No Drawing. Application April 20, 1940, Serial No. 330,771

9 Claims. (Cl. 260—469)

The purpose of this invention is the production of new compounds having a relaxing effect on smooth muscle similar to that produced by atropine or papaverine. More specifically, this invention relates to the production of aminoalcohol esters of fluorene-9-carboxylic acid, the water soluble salts of which exhibit a very powerful anti-spasmodic effect.

The naturally occurring drugs, atropine and papaverine, while clinically useful as anti-spasmodics, have many drawbacks familiar to the practicing physician. Thus, in therapeutic doses, atropine is almost entirely neurotropic in action, and quite ineffective against spasms of a purely muscular type, while papaverine is musculotropic, and has little effect against spasms induced by neural excitation. Tachycardia, dilation of the pupil, and inhibition of salivation, are further undesirable side effects resulting from the use of atropine. The non-specific action of papaverine, resulting among other things in a prolonged fall in arterial pressure following its use, is a distinct disadvantage of papaverine. More recently, a number of synthetic compounds have been described as being of value for this purpose. Guggenheim in United States Patent No. 1,932,341 and Miescher in United States Patent No. 2,079,962 have shown that certain aminoalcohol esters of mono and poly-phenyl substituted fatty acids possess anti-spasmodic properties. Other workers (Fromherz; Archiv. für experimentelle Pathologie und Pharmakologie, volume 173, page 116, 1933, and Halpern; Archives Internationales de Pharmaco-dynamine et de Therapie, volume 59, page 149, 1938) have pointed out the anti-spasmodic value of the aminoalcohol esters of a number of branched chain and phenyl substituted aliphatic acids. None of the compounds thus described appear to eliminate completely the drawbacks associated with atropine or papaverine, while at the same time retaining satisfactory anti-spasmodic efficiency. I have now found that aminoalcohol esters of fluorene-9-carboxylic acid of the formula

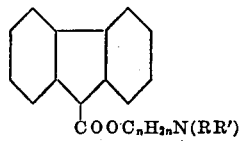

$COOC_nH_{2n}N(RR')$ where $n$ stands for 2 or 3, and R and R' represent any alkyl group having not more than four carbon atoms, not only possess remarkable anti-spasmodic properties, but to an extraordinary degree are free of the disadvantages associated with both atropine and papaverine.

It has further been found that these esters may advantageously be prepared by causing fluorene-9-carboxylic acid, or a salt thereof, to react with an appropriate dialkylaminoalkyl halide, or a salt thereof, in the presence of an appropriate solvent. Alternatively, these esters may be prepared by causing the acid chloride of fluorene-9-carboxylic acid to react with an appropriate aminoalcohol, preferably in the presence of an inert diluent. The following specific examples will serve to illustrate the manner in which this invention may be applied.

Example 1.—136 grams of fluorene-9-carboxylic acid were dissolved in 950 cubic centimetres of warm isopropanol. The solution was then cooled to room temperature, 88 gm. of β-diethylaminoethyl chlorine added, and the whole boiled under a reflux condenser for two hours. After removal of the solvent by distillation under reduced pressure, the residue was allowed to crystallize by standing a short time. This was finely ground under ethyl acetate, and purified by recrystallization from a mixture of isopropanol and ethyl acetate. The pure hydrochloride of the β-diethylaminoethyl ester of fluorene-9-carboxylic acid thus obtained melted at 143–144° centigrade.

In carrying out the process according to the above example, while isopropanol was found to be a preferred solvent, anhydrous solvents such as absolute ethanol, dioxan, benzene, toluene, or others in which the reactants are soluble to an appreciable extent, may be used. The temperature was preferably maintained in the range of from about 80 to 100° C. In place of diethylaminoethyl chloride, the corresponding bromide may be successfully used.

Addition of an alkali to an aqueous solution of the salt prepared in Example 1 caused the separation of the free amino ester as a clear yellow oil. This oil could not be distilled at pressures as low as 0.05 millimetre without decomposition. The free ester may be converted into a variety of salts by the addition of an absolute alcoholic solution of the appropriate acid to an ethereal solution of the ester, causing the precipitation of the corresponding salt. In this way, the above-described crystalline hydrochloride was reformed by the use of alcoholic hydrogen chloride.

Salts of other acids, as the sulfate, bromide, acetate, citrate, phosphate, tartrate, are generally obtained as viscous oils or glasses which are resistant to crystallization. The nitrate may be prepared by double decomposition of the hydrochloride with silver nitrate. All of these salts are freely soluble in water.

By substitution of equivalent quantities of other dialkylaminoalkyl halides, such as β-dimethylaminoethyl chloride, β-diethylaminopropyl chloride, γ-diethylaminopropyl chloride, or β-di-n-butylaminoethyl chloride for the β-diethylaminoethyl chloride used in Example 1, the hydrochlorides of the corresponding dialkylaminoalkyl esters of fluorine-9-carboxylic acid may be obtained. These are first formed as viscous oils which can be made to crystallize only with great difficulty. The melting points of those which I have succeeded in bringing to crystallization are: β-diethylaminopropyl ester hydrochloride, 177° centigrade; γ-diethylaminopropyl ester hydrochloride, 220° centigrade; β-di-n-butylaminoethyl ester hydrochloride, 165° centigrade. The identity and purity of any of these compounds may conveniently be established by elementary analysis of the free amino esters, or of crystalline salts where obtained. The hydrochlorides, whether crystalline or oily, may be converted to the free amino esters, and to other salts as described above.

The dialkylaminoalkyl chlorides referred to above may be conveniently prepared according to the directions published by Slotta and Behnish, Berichte der Deutschen Chemische Gesellschaft, volume 68, page 754, 1935.

*Example 2.*—37 gm. of pure fluorene-9-carboxylic acid are converted to the acid chloride in any convenient fashion, as, for instance, by the use of thionyl chloride. This acid chloride is dissolved in 200 cc. of dry benzene, 36 gm. of β-diethylaminoethanol added, and the mixture heated under reflux for one hour. The mixture is cooled, poured into dilute sodium hydroxide solution, and the benzene layer separated. The aqueous solution is further extracted with small amounts of ether, the combined ether and benzene solutions dried, and solvents (along with some unchanged aminoalcohol) removed in the usual manner by distillation. The β-diethylaminoethyl ester of fluorene-9-carboxylic acid thus obtained is best purified by conversion to the hydrochloride as above described, and crystallization of the hydrochloride.

I have found that the processes described in Examples 1 and 2 are quite general for the compounds embraced within the present invention, and either may be used to prepare these compounds. For reasons of convenience of operation, I consider the method described in Example 1 to be a preferred method of preparation. These examples are given merely to illustrate the method by which these processes may be carried out, and should not be considered to limit the invention in any way.

In general, it may be said of the amino esters embraced within the present invention that they are all clear, light colored oils, almost completely insoluble in water, but quite freely soluble in most organic solvents, such as alcohol, benzene, carbon tetrachloride, carbon disulfide, dioxane, ethyl acetate, ether, etc. They are not distillable at pressures as low as 0.05 mm. without some decomposition.

The salts of these esters, whether in crystalline, oily or glassy condition, are generally very soluble in water, and to a greater or less extent in such organic solvents as the lower alcohols and acetone, but quite insoluble in such solvents as ether, benzene, and carbon tetrachloride. In many instances, they are obtained as oils which are difficult or impossible to crystallize. The presence of moisture in the salt always renders such crystallization more difficult.

*Example 3.*—As an example of the valuable pharmacological properties exhibited by these aminoalcohol esters of fluorene-9-carboxylic acid, the properties of the hydrochloride of the β-diethylaminoethyl ester of this acid (a preferred form of the invention) are given in some detail. When used to abolish the contractions of the isolated rabbit intestine caused by acetylcholine, this ester was found effective in about ten times the concentration necessary for atropine, while β-diethylaminoethyl diphenylacetate (one of the compounds disclosed by Miescher and at present finding some clinical use in this country) required two to five times the concentration of the ester of the present invention to produce the same result, and papaverine was ineffective. This fluorene-9-carboxylic ester is approximately as effective as papaverine in abolishing the contractions of the rabbit intestine produced by barium chloride, the above-cited properties demonstrating both neurotropic and musculotropic efficiency. It is also more active than the corresponding diphenylacetic ester on the intestine in situ in lowering the tone caused by the administration of physostigmine in an anesthetised dog, and in relaxing the hunger contractions caused by the injection of insulin into a normal, unanesthetised, fasting dog. In addition, the effect lasts longer. It is also three times as potent as the corresponding diphenylacetate in abolishing spasm of the cardiac sphincter. It is effective in lowering the tone of the urinary bladder and of the uterus.

While β-diethylaminoethyl fluorene-9-carboxylate is thus seen to be extraordinarily efficient in many of the uses to which atropine and papaverine are put, it is found that it is less than one one-hundredth as potent as atropine in inhibition of salivation and in mydriatic effect and in effect on circulation. In therapeutic doses, it does not produce the prolonged fall in blood pressure frequently associated with the use of therapeutic quantities of papaverine. It is thus apparent that the most serious side effects associated with the use of atropine and papaverine have been substantially eliminated in this compound.

Tested in a similar manner, the hydrochlorides of the fluorene-9-carboxylic esters of β-diethylaminopropanol, of γ-diethylaminopropanol and of β-dibutylaminoethanol exhibited anti-spasmodic properties slightly less intense than those cited in Example 3 for the hydrochloride of β-diethylaminoethyl fluorene-9-carboxylate; that is, the effective dose for these compounds is essentially the same as for the preferred compound, but the degree of relaxation produced is not quite as great.

We have further found that the compounds described herein posses distinct local anesthetic properties when tested according to conventional procedures. It appears possible that occurrences of anti-spasmodic and anesthetic properties in the same molecule may be two individual manifestations of a more general property possessed by these esters of rendering nerve endings and tissue less sensitive to mechanical or chemical irritation, though the therapeutic utility of these esters is in no way affected by the ultimate accuracy of this hypothesis.

Inasmuch as the pharmacological activity of the compounds described herein is apparently due to the amino-alcohol ester, and not to the acid with which it is combined to form a salt (salt formation being merely for the purpose of achieving water solubility), it is obvious to anyone skilled in the art that salts of many non-toxic acids may be used in the practice of this invention. As examples of such acids, salts of sulfuric, nitric, hydrobromic, phosphoric, citric, tartaric, acetic, succinic, and other acids may be used. It is to be understood that the term "ester" as used in the appended claims shall be construed to refer to esters not only in the free state but also as combined with such acids in the form of salts.

The above descriptions and data are given merely as illustrative of the broader purpose and spirit of this invention, and should not be construed as limiting the invention in any way, save as defined in the herein appended claims.

I claim:

1. New compounds useful as therapeutic agents consisting of the aminoalcohol esters of fluorene-9-carboxylic acid of the formula

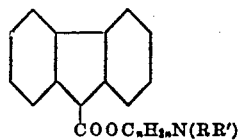

COOC$_n$H$_{2n}$N(RR')

wherein $n$ is an integer between 1 and 4, and R and R' represent alkyl groups having not more than four carbon atoms.

2. New compounds useful as therapeutic agents consisting of the aminoalcohol esters of fluorene-9-carboxylic acid of the formula

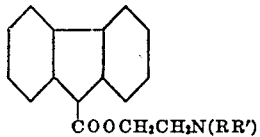

COOCH$_2$CH$_2$N(RR')

wherein R and R' represent alkyl groups containing not more than four carbon atoms.

3. New compounds useful as therapeutic agents consisting of the aminoalcohol esters of fluorene-9-carboxylic acid of the formula

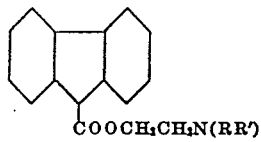

COOCH$_2$CH$_2$N(RR')

wherein R and R' each are one of the groups consisting of methyl and ethyl.

4. A new compound useful as a therapeutic agent, consisting of the diethylaminoethyl ester of fluorene-9-carboxylic acid of the formula

COOCH$_2$CH$_2$N(C$_2$H$_5$)$_2$

5. New compounds useful as therapeutic agents consisting of the aminoalcohol esters of fluorene-9-carboxylic acid of the formula

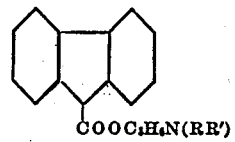

COOC$_3$H$_6$N(RR')

wherein R and R' represent alkyl groups having less than four carbon atoms and the C$_3$H$_6$ chain is one of the group consisting of propyl and isopropyl.

6. New compounds useful as therapeutic agents consisting of the aminoalcohol esters of fluorene-9-carboxylic acid of the formula

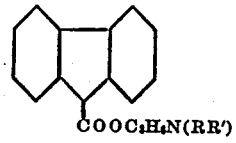

COOC$_3$H$_6$N(RR')

wherein R and R' each are one of the group comprising methyl and ethyl, and the C$_3$H$_6$ chain is one of the group consisting of propyl and isopropyl.

7. In the process of manufacturing basic esters of fluorene-9-carboxylic acid, the step which comprises causing an aminoalkylhalide of the formula (RR')NC$_n$H$_{2n}$X, wherein $n$ is an integer between 1 and 4, R and R' are alkyl groups containing not more than four carbon atoms and X is one of the group comprising chlorine and bromine to react upon fluorene-9-carboxylic acid in the presence of an anhydrous solvent.

8. In the process of manufacturing basic esters of fluorene-9-carboxylic acid, the step which comprises causing an aminoalkylhalide of the formula (RR')NC$_n$H$_{2n}$X, wherein $n$ is an integer between 1 and 4, R and R' are alkyl groups containing not more than four carbon atoms, and X is one of the group comprising chlorine and bromine, to react upon fluorene-9-carboxylic acid in the presence of isopropanol as a solvent.

9. In the process of manufacturing the β-diethylaminoethyl ester of fluorene-9-carboxylic acid, the step which comprises causing β-diethylamino chloride to react upon fluorene-9-carboxylic acid in the presence of isopropanol as a solvent.

ROBERT R. BURTNER.

CERTIFICATE OF CORRECTION.

Patent No. 2,262,754.                                November 18, 1941.

ROBERT R. BURTNER.

It is hereby certified that error appears in the printed specification of the above numbered patent requiring correction as follows: Page 3, first column, line 58, claim 3, for the word "groups" read --group--; and second column, line 57, claim 9, for the syllable "amino" read --aminoethyl--; and that the said Letters Patent should be read with this correction therein that the same may conform to the record of the case in the Patent Office.

Signed and sealed this 13th day of January, A. D. 1942.

(Seal)

Henry Van Arsdale,
Acting Commissioner of Patents.